(12) United States Patent
Yamaoka et al.

(10) Patent No.: US 11,254,006 B2
(45) Date of Patent: Feb. 22, 2022

(54) ROBOT DEVICE

(71) Applicant: Fanuc Corporation, Yamanashi (JP)

(72) Inventors: Nobuaki Yamaoka, Yamanashi (JP); Hajime Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 302 days.

(21) Appl. No.: 16/659,731

(22) Filed: Oct. 22, 2019

(65) Prior Publication Data

US 2020/0147799 A1    May 14, 2020

(30) Foreign Application Priority Data

Nov. 14, 2018  (JP) .............................. JP2018-214010

(51) Int. Cl.
*B25J 9/16*   (2006.01)
*B25J 19/02*  (2006.01)

(52) U.S. Cl.
CPC ............. *B25J 9/1692* (2013.01); *B25J 9/163* (2013.01); *B25J 19/023* (2013.01)

(58) Field of Classification Search
CPC ........ B25J 9/1692; B25J 19/023; B25J 9/163; B25J 9/1697; B25J 9/1664; B25J 9/1602; B25J 13/08; G05B 2219/45104
See application file for complete search history.

(56) References Cited

U.S. PATENT DOCUMENTS

2009/0157226 A1*  6/2009  de Smet .............. G01B 11/002
                                                                700/254
2016/0291571 A1   10/2016  Cristiano

FOREIGN PATENT DOCUMENTS

| JP | 11202928 A | 7/1999 |
|----|------------|--------|
| JP | 2011-167817 A | 9/2011 |
| JP | 2012176477 A | 9/2012 |
| JP | 2012-240142 A | 12/2012 |
| KR | 20070087162 A | 8/2007 |

* cited by examiner

*Primary Examiner* — Basil T. Jos
(74) *Attorney, Agent, or Firm* — RatnerPrestia

(57) ABSTRACT

A robot device includes: a robot; an operation control section; a sensor configured to detect a value related to a position of a control target portion of the robot; a low-speed position information acquisition section configured to acquire low-speed position information of the control target portion; a calibration section configured to perform calibration between the sensor and the robot by using the low-speed position information and a command position; and a learning control section configured to learn a correction amount that reduces a deviation between operation described in an operation program and an actual operation of the control target portion, by using a detection value of the sensor that is acquired when the robot is operated in accordance with the operation program, the low-speed position information or the command position, and calibration data acquired through the calibration.

4 Claims, 11 Drawing Sheets

ROBOT DEVICE

CROSS-REFERENCE TO RELATED APPLICATIONS

This application is a new U.S. Patent Application that claims benefit of Japanese Patent Application No. 2018-214010, dated Nov. 14, 2018, the disclosure of this application is being incorporated herein by reference in its entirety for all purposes.

BACKGROUND OF THE INVENTION

1. Field of the Invention

The present invention relates to a robot device used for performing laser processing and other various processing.

2. Description of the Related Art

In processing systems that perform laser processing and other various processing, the trajectory accuracy of robots is important. However, the processing quality may be degraded by vibrations or shifts of the tip position of the robot from the target position due to an accuracy degradation factor such as the friction, backlash, and insufficient rigidity of the reduction gear or robot arm. As a countermeasure against such problems, a method has been proposed in which a sensor is attached at the tip of a robot, positional deviation and/or vibrations during robot operation is measured with the sensor, and learning control is repeatedly performed to thereby reduce the positional deviation and/or vibrations (e.g., JP 2011-167817 A and JP 2012-240142 A).

SUMMARY OF THE INVENTION

In the case where the operation trajectory of the tip position of the robot is measured by using a sensor and the learning control is performed, the user of the processing system has to perform calibration between the coordinate system of the robot and the coordinate system of the sensor. Typically, calibration takes a long time, and the effect of improving the trajectory accuracy through the learning control is degraded if the accuracy of the calibration is poor. A robot device capable of automatically performing highly accurate calibration between the coordinate system of a robot and the coordinate system of a sensor is desired.

One aspect of the present disclosure is a robot device including: a robot; an operation control section configured to control an operation of the robot; a sensor configured to detect a value related to a position of a control target portion of the robot; a low-speed position information acquisition section configured to acquire low-speed position information of the control target portion by using a detection value related to the position of the control target portion, the detection value being detected by the sensor when the operation control section causes the robot to perform operation described in an operation program at a speed lower than a speed specified in the operation program; a calibration section configured to perform calibration between the sensor and the robot by using the low-speed position information and a command position according to the operation program; and a learning control section configured to learn a correction amount for reducing a deviation between the operation described in the operation program and an actual operation of the control target portion, by using a detection value of the sensor that is acquired when the operation control section operates the robot in accordance with the operation program, the low-speed position information or the command position, and calibration data acquired through the calibration.

BRIEF DESCRIPTION OF THE DRAWINGS

The objects, features and advantages of the invention will become more apparent from the following description of the embodiments in connection with the accompanying drawings. In the accompanying drawings.

DETAILED DESCRIPTION

Figure 1:
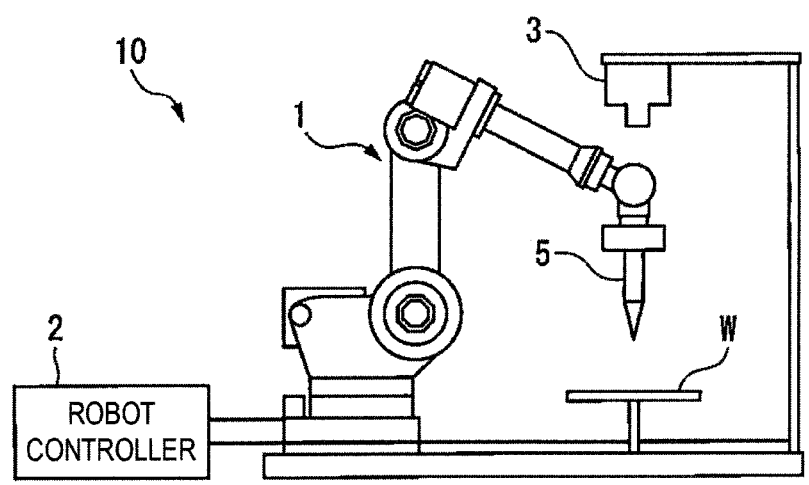
FIG. 1 is a diagram illustrating an overall configuration of a robot device according to an embodiment.

An embodiment of the present disclosure will be described below with reference to the accompanying drawings. Throughout the drawings, corresponding components are denoted by common reference numerals. In the drawings to be referred to, the same component parts or functional parts are denoted with the same reference numerals. The drawings are scaled appropriately to facilitate understanding. Note that modes illustrated in the drawings are merely examples to implement the invention, and the invention is not limited to the modes illustrated.

FIG. 1 is a diagram of a robot device 10 according to an embodiment. As illustrated in FIG. 1, the robot device 10 includes a robot 1, a robot controller 2 that controls operation of the robot 1, and a camera 3 fixed to a mounting surface of the robot 1. A processing tool 5 is attached to an arm tip portion of the robot 1. The robot device 10 can be used in various processing such as laser processing (welding, cutting, etc.) and water-jet cutting. The processing tool 5 is, for example, a tool for performing laser processing by irradiating a workpiece W with laser light.

Figure 2:
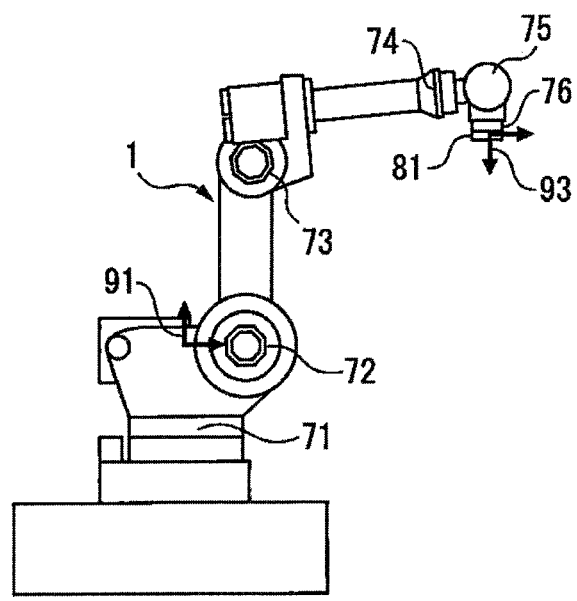
FIG. 2 is a diagram illustrating a configuration of a robot.

The robot controller 2 may have a configuration of a commonly used computer including a CPU, a ROM, a RAM, a storage device, etc. The robot controller 2 controls operation of the robot 1 in accordance with an operation program that is preloaded in the robot controller 2. The robot 1 is, for example, a vertical articulated robot including a first joint 71 through a sixth joint 76 as illustrated in FIG. 2. Note that the configuration of the robot 1 according to the present embodiment is not limited to such an example. As a coordinate system that defines the position of the robot 1, a world coordinate system 91 is set by defining an origin at the base of the robot 1.

The robot device 10 according to the present embodiment is configured to determine a positional deviation from a target position of the operation trajectory of the robot 1 by measuring the position of the robot 1 during operation (the position of the control target portion) by the sensor and to perform learning control for reducing the positional deviation. Here, the control target portion of the robot is, for example, a TCP (tool center point) of the robot. With this configuration, the robot device 10 can prevent occurrence of a situation where the processing quality is affected by vibrations or shifts of the tip position of the robot from the target position (command position) due to an accuracy degradation factor such as the friction, backlash, and insufficient rigidity of the reduction gear or robot arm. While various sensors such as an acceleration sensor, a force sensor, a vision sensor, and a laser tracker may be used as a sensor for measuring the position of the robot 1 during operation, the present embodiment employs a configuration in which the camera 3 as a vision sensor captures and acquires an operation trajectory of the robot 1.

In the case where learning control is performed by measuring the positional deviation by using the sensor in the above-described manner, it is necessary to perform calibration between a coordinate system of the robot 1 and a coordinate system of the sensor. As described below, the robot device 10 automatically performs calibration between the world coordinate system 91 and the coordinate system of the camera 3 (hereinafter also referred to as a camera coordinate system).

Figure 3:
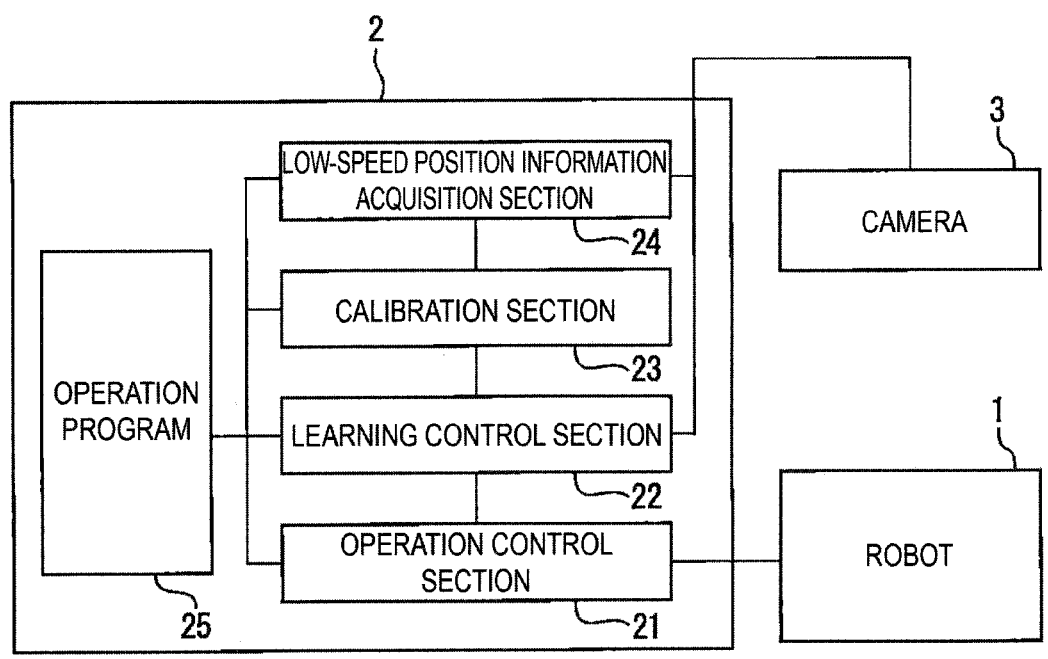
FIG. 3 is a functional block diagram of a robot controller.

FIG. 3 illustrates a functional block diagram of the robot controller 2. The functional blocks illustrated in FIG. 2 may be achieved as dedicated hardware or may be achieved by executing software with the CPU of the robot controller 2 in cooperation with hardware. In the robot controller 2, an operation control section 21 controls the operation (position and orientation) of the robot 1 in accordance with an operation program 25. More specifically, the operation control section 21 controls the position, speed, etc. of the drive shaft of each joint of the robot 1 in accordance with the operation program 25. By comparing a command position of the robot 1 on the basis of the operation program 25 with an operation trajectory of the robot 1 captured by the camera 3, a learning control section 22 determines the positional deviation of the actual operation trajectory of the robot 1 with respect to the command position and determines a correction amount that reduces the positional deviation through learning control. A low-speed position information acquisition section 24 acquires low-speed position information of the robot 1 (in the present embodiment, an operation trajectory of the robot 1) by using a detection value of the sensor that is related to the position of the robot 1 (in the present embodiment, an image captured by the camera 3) in the case where the operation control section 21 causes the robot to perform operations described in the operation program 25 at a speed lower than the speed specified in the operation program 25. A calibration section 23 performs calibration between the world coordinate system 91 and the camera coordinate system.

Figure 4:
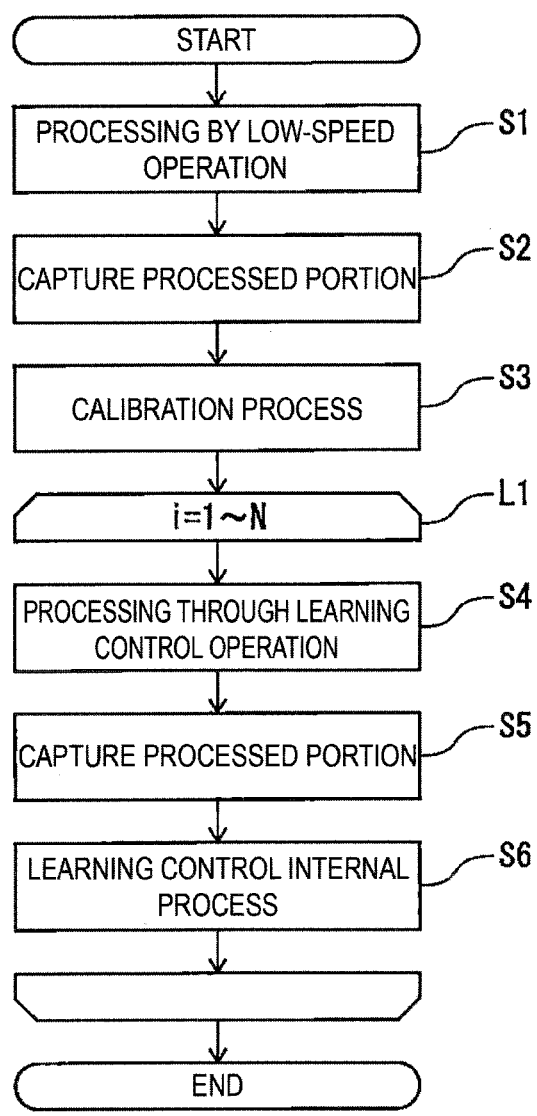
FIG. 4 is a flowchart illustrating calibration and a learning control.

FIG. 4 is a flowchart illustrating a process for reducing positional deviation through learning control. The process of FIG. 4 is performed under control of the robot controller 2. First, the robot controller 2 causes the robot 1 to perform a target operation at a low speed (step S1). Here, the speed in the low-speed operation is lower than the operation speed specified in the operation program, and is low enough to the extent that the influence of accuracy degradation factors, such as vibrations, with respect to the robot 1 can be neglected. The speed during the low-speed operation may be set to a speed sufficiently lower than the speed specified in the operation program (e.g., a speed of 1/10). The robot controller 2 captures, with the camera 3, the operation trajectory on a workpiece W which has been processed by the low-speed operation by the robot 1 and acquires dot-sequential data of the processed portion (step S2). By operating the robot 1 at a low speed in this manner, it is possible to acquire an operation trajectory with no error (or with a minimal error) relative to the command trajectory described in the operation program 25. Note that the processes of steps S1 and S2 are performed under the control of the low-speed position information acquisition section 24.

Figure 5:
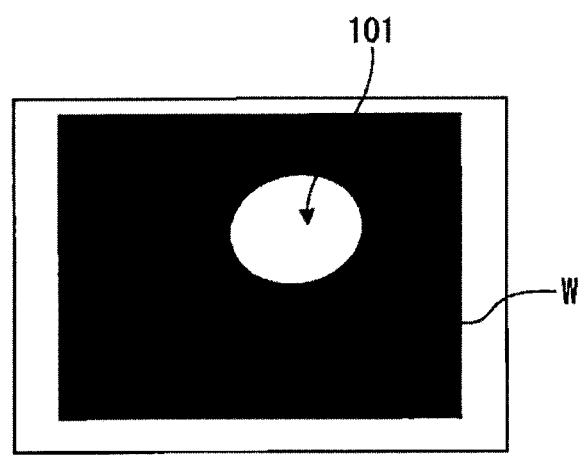
FIG. 5 is a diagram illustrating an exemplary captured image of a processed portion.

Next, at step S3, calibration is performed between the coordinate system of the robot 1 (world coordinate system 91) and the coordinate system of the camera 3 (camera coordinate system) by using the above-described dot-sequential data acquired with the camera 3 and the command value data in the above-described low-speed operation. The calibration is performed under control of the calibration section 23. An exemplary calibration process is described below on the assumption that the command described in the operation program is a command for performing laser processing for a circle having a diameter of 150 mm. It is assumed that, after the command as to perform the laser processing for a circle with a diameter of 150 mm is performed by a low-speed operation at step S1, an image of the workpiece W is captured by the camera 3 at step S2 as illustrated in FIG. 5. In FIG. 5, the white portion in the image is the portion where the laser processing has been performed (hereinafter referred to as a processed portion 101). The image of the processed portion 101 captured from the camera 3 may not be circular due to the installation error or the like of the camera 3.

Figure 6:
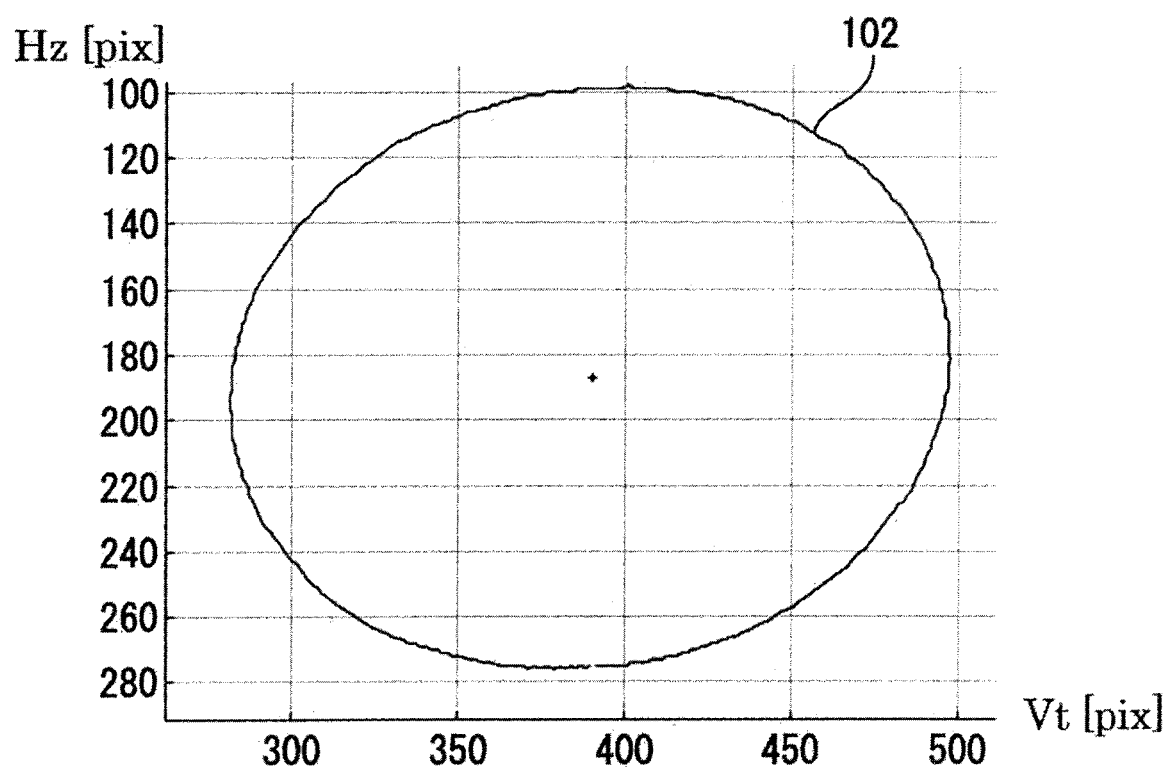
FIG. 6 is a diagram illustrating edge data acquired from the image of FIG. 5.
Figure 7:
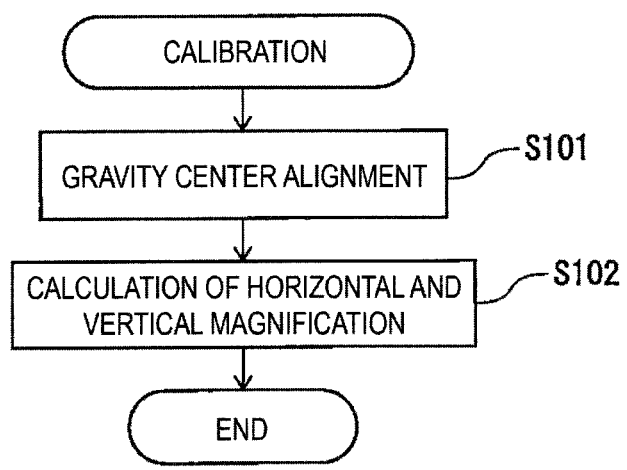
FIG. 7 is a flowchart illustrating an exemplary calibration process in the case where a command trajectory is circular.

First, to perform the calibration process, an edge portion is extracted from the captured image of FIG. 5. The extraction of the edge data and the processes preceding the extraction may be performed by the low-speed position information acquisition section 24. It is assumed that, as an extraction result of the edge portion, edge data (dot-sequential data) 102 is acquired as illustrated in FIG. 6. Note that in FIG. 6, the vertical axis and the horizontal axis represent a horizontal pixel position and a vertical pixel position, respectively. The calibration of the camera 3 is performed by determining the relationship between the edge data 102 in FIG. 6 and the command trajectory in the low-speed operation. FIG. 7 illustrates an exemplary calibration process in the case where the command trajectory is circular. First, gravity center alignment is performed by aligning the geometric center of the edge data 102 and the center of the circle according to the command trajectory with each other (step S101). Next, the edge data 102 and the circle according to the command trajectory are aligned with each other by applying, to the edge data 102, individual magnifications in the horizontal direction and the vertical direction (step S102). The shift amount of the edge data 102 acquired in the process of the gravity center alignment and the horizontal and vertical magnifications for aligning the edge data 102 with the circle according to the command trajectory constitute calibration data (i.e., calibration data for converting a camera coordinate system into a world coordinate system).

Figure 8:
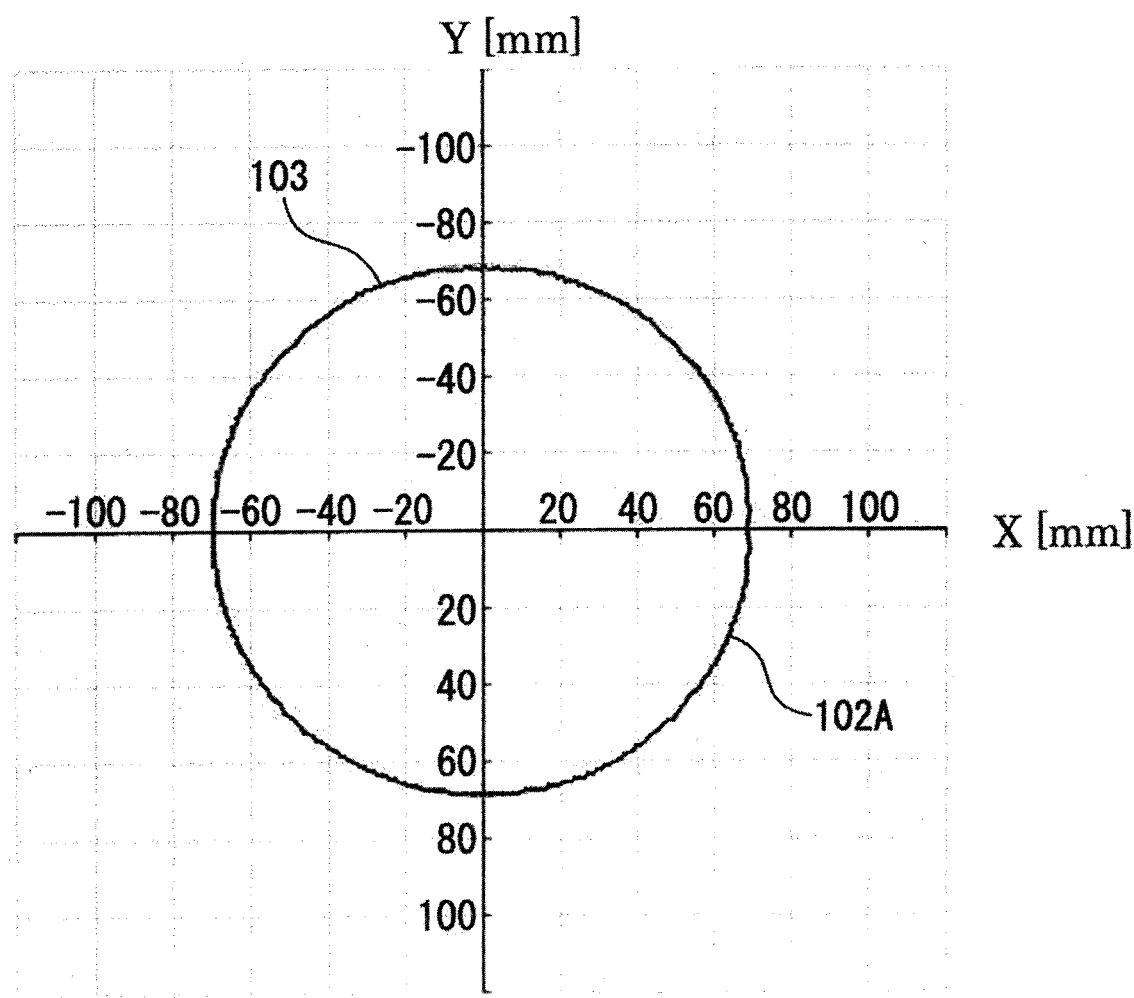
FIG. 8 is a diagram illustrating a state where an operation trajectory after calibration matches a command trajectory.

FIG. 8 illustrates an operation trajectory 102A that is obtained by converting the edge data 102 that is the operation trajectory of the low-speed operation into the coordinate system of the robot 1 by using the calibration data acquired in the above-described manner. As illustrated in FIG. 8, the operation trajectory 102A after the calibration matches a command trajectory 103 of the robot 1.

Figure 9:
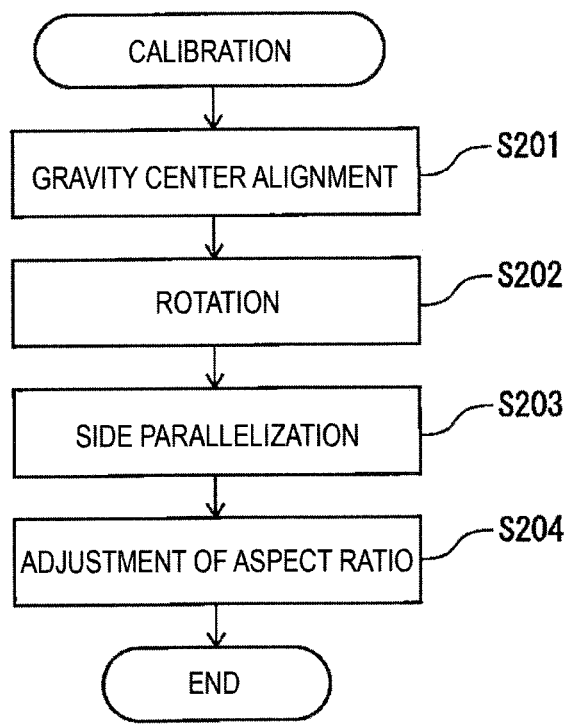
FIG. 9 is a flowchart illustrating an exemplary calibration process in the case where a command trajectory is square.

While FIG. 7 illustrates an exemplary calibration process in the case where the command trajectory is circular, FIG. 9 illustrates an exemplary calibration process in the case where the command trajectory is square. In this case, first, gravity center alignment of edge data, obtained by operating the robot 1 at a low speed and by capturing the operation trajectory after the processing, with the square of the command trajectory is performed (step S201). The edge data is then rotated (step S202) to parallelize the corresponding sides of the square of the edge data and the square of the command trajectory (step S203). Next, the aspect ratio of the edge data is adjusted to match the square of the edge data and the square of the command trajectory (step S204). The shift amount acquired in the gravity center alignment, the rotation amount, and the adjustment amount of the aspect ratio acquired through the above-described processes constitute calibration data. Note that, also in the case where the command trajectory has other shapes, calibration data can be acquired through a process similar to the process illustrated in FIGS. 7 and 9.

Through the above-described calibration process, highly accurate calibration for the camera 3 can be automatically performed.

Returning to the description of FIG. 4, next, a learning control that repeats learning through a loop process L1 is performed. The learning control is performed under control of the learning control section 22. When the learning control is started, the processing is performed at an operation speed specified in the operation program (hereinafter also referred to as a high-speed operation) (step S4). In this case, when the correction amount has been calculated through the previous internal process for the learning control (step S6), correction is performed by applying that correction amount to the operation command according to the operation program, and then the processing is performed. Next, the trajectory after the processing is captured with the camera 3 to acquire edge data (dot-sequential data) of the processed portion (step S5).

Next, learning control for determining a correction amount for reducing the positional deviation is performed on the basis of the operation trajectory in the high-speed operation that is acquired at step S5 (step S6). Various techniques known in the art may be used as a learning control method for determining a correction amount for reducing the positional deviation between the actual operation trajectory and the target trajectory. Here, a process for determining a correction amount is performed as follows. While the target trajectory serving as a reference for determining the positional deviation may be an operation trajectory in a low-speed operation or a command trajectory for the robot 1, the following describes an exemplary case where an operation trajectory in a low-speed operation is used.

Figure 10:
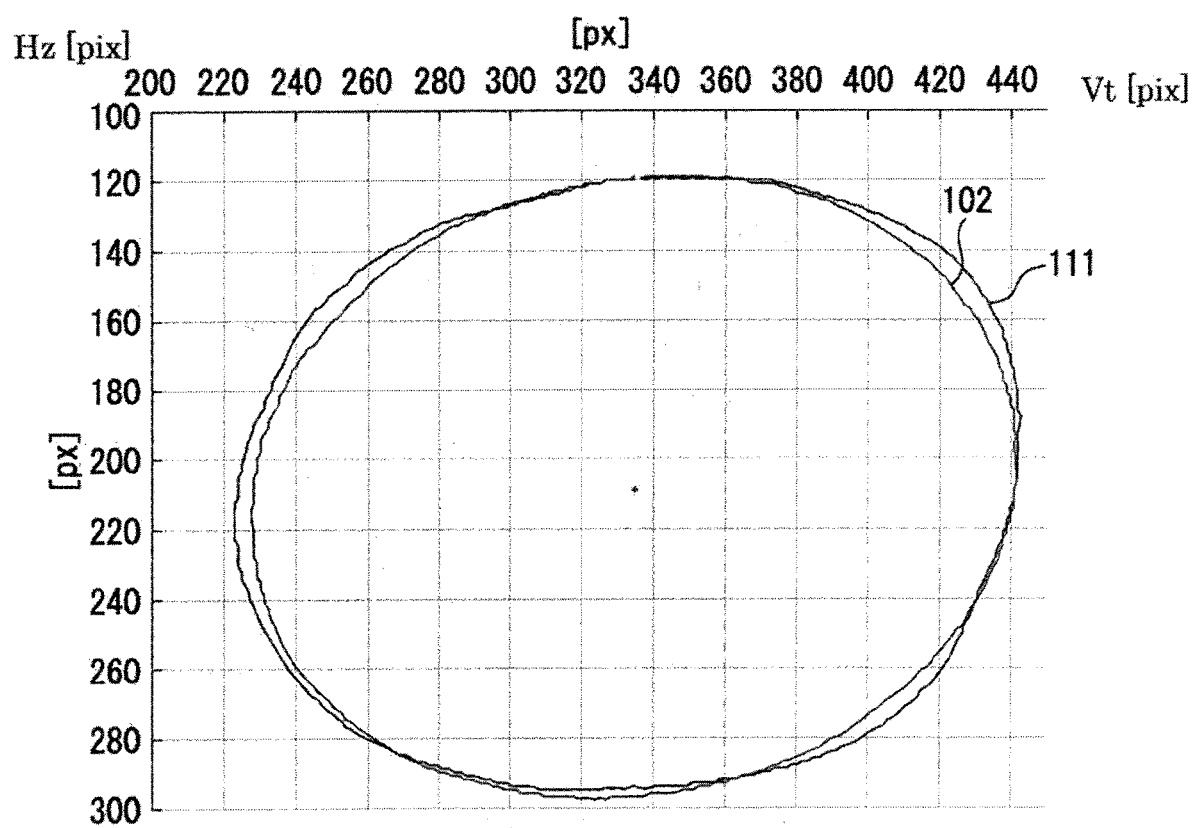
FIG. 10 is a diagram illustrating an operation trajectory in a low-speed operation and an operation trajectory in a high-speed operation.
Figure 11:
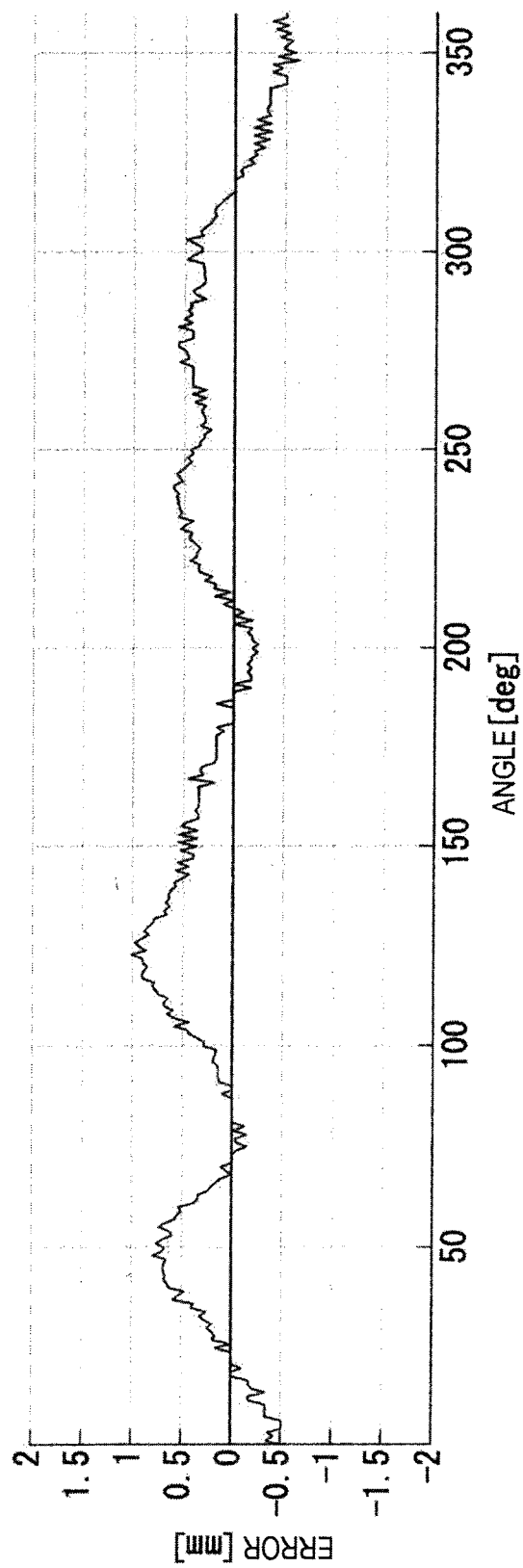
FIG. 11 is a graph obtained by plotting an error at each angle between an operation trajectory in a low-speed operation and an operation trajectory in a high-speed operation.
Figure 12:
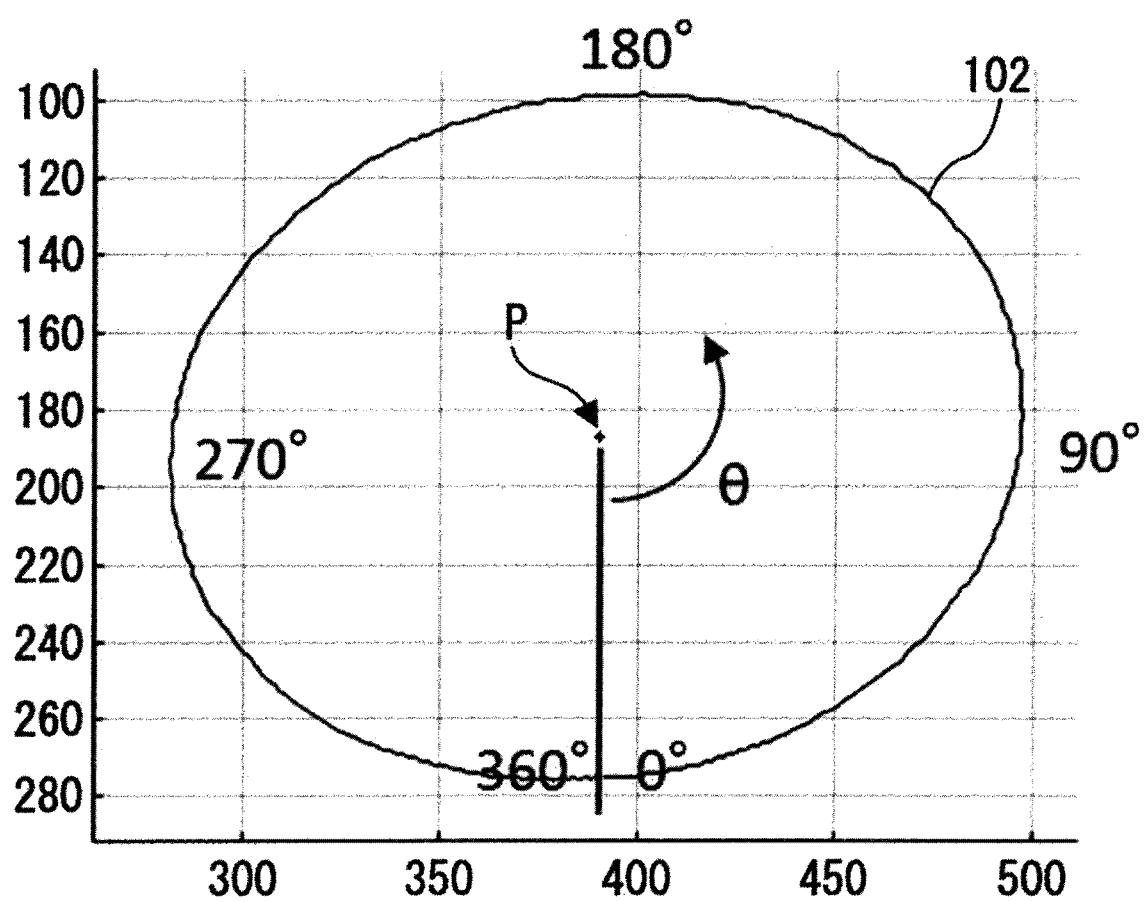
FIG. 12 is a diagram for illustrating a definition of an angle in the graph of FIG. 11.

FIG. 10 illustrates the operation trajectory 102 in a low-speed operation and an operation trajectory 111 in a high-speed operation acquired by capturing with the camera 3. In FIG. 10, the vertical axis and the horizontal axis represent a vertical pixel position and a horizontal pixel position, respectively. FIG. 11 is a graph representing an error, at each angle, of the operation trajectory 111 with respect to the operation trajectory 102, which is plotted after the operation trajectory 102 in the low-speed operation and the operation trajectory 111 in the high-speed operation are calibrated by using calibration data. Here, the angle of the horizontal axis in FIG. 11 may be defined as an angle θ that is positive in the counterclockwise rotational direction about a geometric center P of the operation trajectory 102 in FIG. 12 with respect to a straight line extending downward parallel to the vertical axis from the geometric center P as illustrated in FIG. 12.

In the calculation of the correction amount through the learning control, a correction amount that cancels out the error illustrated in FIG. 11 is determined and stored in the memory in the learning control section 22. The command position in the next processing operation (step S4) is corrected by using the correction amount. By repeating such learning by a predetermined number of times (N times in FIG. 4), the positional deviation is reduced. The learning control may be repeated until the positional deviation converges to zero or a negligible level. Thus, the process of FIG. 4 is completed.

Through the above-described processes, precise learning control can be performed by acquiring the positional deviation by using the output (captured image) of the camera 5 that has been calibrated. In particular, in the above-described processes, the calibration process is automatically performed by using the command value data in the low-speed operation and the dot-sequential data acquired with the camera 3. Thus, concerns about a poor accuracy of the calibration due to operational errors and insufficient experience of the user are eliminated, and a stable learning control performance can be achieved.

That is, according to the present embodiment, highly accurate calibration between the sensor coordinate system (e.g., the camera coordinate system) and the world coordinate system can be automatically performed. Also, precise learning control can be performed with a positional deviation acquired using a sensor output (e.g., a camera image) that is highly accurately calibrated.

While the embodiments of the present disclosure have been described above, it should be understood by those skilled in the art that various alterations or modifications may be made without departing from the scope of the claims described later.

While the above-described embodiment employs a configuration in which an operation trajectory of a robot is acquired by measuring a processed portion with the camera 3 as a vision sensor, the measurement location for acquiring the operation trajectory of the robot may be a portion on the robot 1. For example, an arm tip portion of the robot 1 may be the measurement location. Further, in the case where an acceleration sensor, a force sensor, or a laser tracker is used as a sensor for acquiring an operation trajectory of a robot, such a sensor may be attached to an arm tip portion of the robot. For example, by attaching an acceleration sensor to an arm tip portion of the robot 1, an operation trajectory of the arm tip portion during operation of the robot 1 can be acquired. As an example, FIG. 2 illustrates a state where a sensor 81 is attached to an arm tip portion (wrist). In this case, a coordinate system 93 fixed at the arm tip portion is set as the coordinate system of the sensor 81.

A configuration may be employed in which a force sensor is attached between the arm tip portion of the robot 1 and the processing tool such that the load associated with the operation of the processing tool 5 is detected with the force sensor. In this case, a triaxial force sensor is used as the force sensor to detect the force of three components, XYZ, during operation of the robot 1. The detected force is converted into the acceleration of the processing tool on the basis of the equation of motion F=ma and the mass m of the processing tool attached at the tip of the force sensor. Next, data representing the relationship between the coordinate system of the robot and the coordinate system of the sensor can be acquired from the converted acceleration and the acceleration acquired through second-order differentiation of the command position of the robot, and calibration of the force sensor can be performed with the acquired data.

In order to solve the issues in the present disclosure, various aspects and their effects can be supplied as described below. Note that, numbers in parentheses in the description of the following aspects correspond to reference signs of the drawings in the present disclosure.

A first aspect of the present disclosure is a robot device (10) including: a robot (1); an operation control section (21) configured to control an operation of the robot (1); a sensor (3) configured to detect a value related to a position of a control target portion of the robot (1); a low-speed position information acquisition section (24) configured to acquire low-speed position information of the control target portion by using a detection value related to the position of the control target portion, the detection value being detected by the sensor (3) when the operation control section (21) causes the robot (1) to perform operation described in an operation program at a speed lower than a speed specified in the operation program; a calibration section (23) configured to perform calibration between the sensor (3) and the robot (1) by using the low-speed position information and a command position according to the operation program; and a learning control section (22) configured to learn a correction amount for reducing a deviation between the operation described in the operation program and an actual operation of the control target portion, by using a detection value of the sensor (3) that is acquired when the operation control section (21) operates the robot (1) in accordance with the operation program, the low-speed position information or the command position, and calibration data acquired through the calibration.

According to the first aspect, highly accurate calibration between the sensor coordinate system (e.g., the camera coordinate system) and the world coordinate system can be automatically performed. Also, precise learning control can be performed with a positional deviation acquired using a sensor output (e.g., a camera image) that is highly accurately calibrated.

In a second aspect of the present disclosure, which is the robot device (10) according to the first aspect, the calibration data acquired through the calibration includes data for converting a coordinate system of the sensor into a coordinate system of the robot.

In a third aspect of the present disclosure, which is the robot device (10) according to the first aspect or the second aspect, the sensor includes a camera (3) configured to capture a trajectory of the actual operation.

In a fourth aspect of the present disclosure, which is the robot device (10) according to the first aspect or the second aspect, the sensor is attached at a wrist of the robot and detects a value representing a position of the wrist.

The invention claimed is:

1. A robot device comprising:
a robot;
an operation control section configured to control an operation of the robot;
a sensor configured to detect a value related to a position of a control target portion of the robot;
a low-speed position information acquisition section configured to acquire low-speed position information of the control target portion by using a detection value related to the position of the control target portion, the detection value being detected by the sensor when the operation control section causes the robot to perform operation described in an operation program at a speed lower than a speed specified in the operation program;
a calibration section configured to perform calibration between the sensor and the robot by using the low-speed position information and a command position according to the operation program; and
a learning control section configured to learn a correction amount for reducing a deviation between the operation described in the operation program and an actual operation of the control target portion, by using a detection value of the sensor that is acquired when the operation control section operates the robot in accordance with the operation program, the low-speed position information or the command position, and calibration data acquired through the calibration.

2. The robot device according to claim 1, wherein the calibration data acquired through the calibration includes data for converting a coordinate system of the sensor into a coordinate system of the robot.

3. The robot device according to claim 1, wherein the sensor includes a camera configured to capture a trajectory of the actual operation.

4. The robot device according to claim 1, wherein the sensor is attached at a wrist of the robot and detects a value representing a position of the wrist.

* * * * *